United States Patent
Liu

(10) Patent No.: US 10,317,276 B2
(45) Date of Patent: Jun. 11, 2019

(54) SYSTEMS AND METHODS FOR MONITORING SURGE CONDITIONS

(71) Applicant: Simmonds Precision Products, Inc., Vergennes, VT (US)

(72) Inventor: Lei Liu, Shelburne, VT (US)

(73) Assignee: Simmonds Precision Products, Inc., Vergennes, VT (US)

(*) Notice: Subject to any disclaimer, the term of this patent is extended or adjusted under 35 U.S.C. 154(b) by 345 days.

(21) Appl. No.: 14/514,117

(22) Filed: Oct. 14, 2014

(65) Prior Publication Data

US 2016/0103012 A1    Apr. 14, 2016

(51) Int. Cl.
*G01H 1/00* (2006.01)
*F04D 27/02* (2006.01)
(Continued)

(52) U.S. Cl.
CPC ........... *G01H 1/006* (2013.01); *F04D 27/001* (2013.01); *F04D 27/02* (2013.01); *F04D 29/668* (2013.01);
(Continued)

(58) Field of Classification Search
CPC ....... G01H 1/006; F01D 21/003; F04D 27/02; F04D 27/001; F04D 29/668; F05D 2270/334; F05D 2260/80
(Continued)

(56) References Cited

U.S. PATENT DOCUMENTS

| 3,240,422 A | 3/1966 | Pettersen et al. | |
| 2012/0035885 A1 | 2/2012 | Tarassenko et al. | |
| 2013/0309060 A1* | 11/2013 | Johnsen ................ | F04D 27/001 415/1 |

FOREIGN PATENT DOCUMENTS

| EP | 2679808 A1 | 1/2014 |
| WO | WO-2004/059399 A2 | 7/2004 |
| WO | WO-2007/086755 A1 | 8/2007 |

OTHER PUBLICATIONS

D. H. Linden and C. Parker, "Surge Detection in an Industrial Axial Flow Compressor," in Proceedings of the Twenty-Fifth Turbomachinery Symposium, 1996, pp. 83-88.
(Continued)

*Primary Examiner* — Leslie J Evanisko
(74) *Attorney, Agent, or Firm* — Locke Lord LLP; Scott D. Wofsy; Alicia J. Carroll

(57) ABSTRACT

A method for monitoring for a surge condition includes detecting a surge condition through vibration signals measured at at least one location in a turbomachine. Detecting a surge condition includes determining a ratio-metric indicator $R_{BR}$ by comparing a blade frequency band $\Omega_B$ to a reference frequency band $\Omega_R$. Detecting a surge condition includes calculating a surge score SS with the following equation:

$$SS = \frac{R_{BR} - R_\mu}{R_\sigma}$$

wherein $R_\mu$ is a sample mean of a set of ratio-metric indicators and $R_\sigma$ is a sample standard deviation of a set of ratio-metric indicators. Detecting a surge condition includes determining whether a surge condition exists based on the surge score.

13 Claims, 4 Drawing Sheets

(51) Int. Cl.
*F04D 27/00* (2006.01)
*F04D 29/66* (2006.01)
*F01D 21/00* (2006.01)

(52) U.S. Cl.
CPC ........ *F01D 21/003* (2013.01); *F05D 2260/80* (2013.01); *F05D 2270/101* (2013.01); *F05D 2270/334* (2013.01)

(58) Field of Classification Search
USPC .......................................................... 702/33
See application file for complete search history.

(56) References Cited

OTHER PUBLICATIONS

M. Kita, et al., "Prediction of Subsynchronous Rotor Vibration Amplitude Caused by Rotating Stall," in Proceedings of the 37th Turbomachinery Symposium, Houston, TX, Sep. 2008, pp. 97-102.
M. Baumgartner, et al., "Non-Engine Order Blade Vibration in a High Pressure Compressor," presented at the 12th International Symposium on Airbreathing Engines, Melbourne, Australia, Sep. 10-15, 1995.
J. Thirstrup Petersen, et al., Prediction of Dynamic Loads and Induced Vibrations in Stall. 1998.
A. I. Gunter, "Bias and Variance of Averaged and Smoothed Periodogram-Based Log-Amplitude Spectra," in Proceedings of the 2nd International Symposium on Image and Signal Processing and Analysis, 2001.
Extended European Search Report dated Mar. 24, 2016, issued during the prosecution of corresponding European Patent Application No. 15189834.3. (5 pages).

\* cited by examiner

SYSTEMS AND METHODS FOR MONITORING SURGE CONDITIONS

BACKGROUND OF THE INVENTION

1. Field of the Invention

The present disclosure relates to turbo machinery, and more particularly to monitoring a surge condition within the turbomachinery under varying loads and speeds by using a vibration signal.

2. Description of Related Art

Most compressor systems, including turbines and fans integrated in various systems to develop pressure differences, are generally carefully operated to avoid running into stall or surge conditions. During a stall or surge condition excessive forces and stresses can be imposed on bearings, or large displacements can be observed on blades because the abnormal operations under stall or surge may exceed design specifications. These conditions can be potential causes of premature failures of various components associated with the compressor system, for example.

One traditional approach to quantify a safe operating region is by using a performance map generated with laboratory measurements to trace the correlated changes of pressure differences and corrected flow rates over a series of corrected speed lines and then establishing a surge line on the map. Then, control laws may be designed to operate a compressor away from the surge line and ensure sufficient safety margins.

Nevertheless, the base variables used to establish the performance map, i.e. temperature and pressure, are non-static and can be difficult to precisely trace for a compressor in practical service. This is because highly variable ambient conditions may introduce large variance in measuring these variables and make pinpointing a location in the map impractical. More importantly, a performance map is established under the assumption of uniformly static conditions and tends to be difficult to use for information corresponding to subtle changes due to violent aerodynamic effects. For example, local pressure variations caused by irregular inlet turbulence may be significant enough to make a compressor's blades go into stall, but still may not warrant a stall warning based on the total static pressure being measured.

Such conventional methods and systems have generally been considered satisfactory for their intended purpose. However, there is still a need in the art for improved systems and methods for monitoring surge and stall events.

SUMMARY OF THE INVENTION

A method for monitoring for a surge condition includes detecting a surge condition through vibration signals measured at at least one location in a turbomachine. Detecting a surge condition includes determining a ratio-metric indicator $R_{BR}$ by comparing a blade frequency band $\Omega_B$ to a reference frequency band $\Omega_R$. Detecting a surge condition includes calculating a surge score SS with the following equation:

$$SS = \frac{R_{BR} - R_\mu}{R_\sigma}$$

wherein $R_\mu$ is a sample mean of a set of ratio-metric indicators and $R_\sigma$ is a sample standard deviation of a set of ratio-metric indicators. Detecting a surge condition includes determining whether a surge condition exists based on the surge score.

Determining if a surge condition exists can include determining that the surge condition does exist if the ratio-metric indicator $R_{BR}$ deviates from the sample mean $R_\mu$ more than three times the ratio sample standard deviation $R_\sigma$. Determining the sample mean $R_\mu$ and the sample standard deviation $R_\sigma$ can include determining the ratio-metric indicators for different speeds within an operating range under known normal conditions, collecting the set of ratio-metric indicators, and calculating the sample mean $R_\mu$ and the sample standard deviation $R_\sigma$ based on the collected set of ratio-metric indicators.

Determining whether a surge condition exists can include statistically analyzing populations of surge scores accumulated in different durations to monitor long term changes and drift, and/or estimating the sample mean $R_\mu$ and the sample standard deviation $R_\sigma$ from vibration signals obtained in-service as an in-system calibration process.

Determining the ratio-metric indicator can include determining a time window length for vibration data acquisition, identifying the blade frequency band $\Omega_B$ and the reference frequency band $\Omega_R$, and collecting vibration data with a known sampling rate with at least one accelerometer operable to generate vibration signals representative of blade vibration and other vibration sources. Determining the ratio-metric indicator can also include segmenting the vibration data into slices based on a time window, determining a power spectrum of a given slice, determining a respective fan rotation speed from the power spectrum, and obtaining respective residual spectrums from the power spectrum for the blade frequency band $\Omega_B$ and the reference frequency band $\Omega_R$. Determining the ratio-metric indicator can also include calculating the ratio-metric indicator $R_{BR}$ for the given slice of vibration data by comparing the power spectrum of the blade frequency band $\Omega_B$ and the reference frequency band $\Omega_R$ with the following equation:

$$R_{BR} = \frac{\sum_{\omega \subset \Omega_B} |S(\omega)|^2}{\sum_{\omega \subset \Omega_R} |S(\omega)|^2}$$

where $S(\omega)$ is the Discrete Fourier Transform, DFT, for a frequency, $\omega$, of the given slice of vibration data.

It is contemplated that the step of determining the fan rotation speed can include rejecting data from which the fan rotation speed is considered to be uncertain. Obtaining respective residual spectrums from the power spectrum can include removing peaks associated with the respective fan rotation speed and its harmonics in the blade frequency band $\Omega_B$ and the reference frequency band $\Omega_R$. A width of a frequency window for the peaks to be removed and the number of frequency components to be processed is tied to the type of time window being used.

A turbomachinery surge monitoring system includes at least one sensor coupled to a compressor system, and a processing unit coupled to the at least one sensor including a plurality of program instructions. The program instructions include instructions to detect a surge condition through vibration signals measured at at least one location in a turbomachine in a similar manner as described above.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
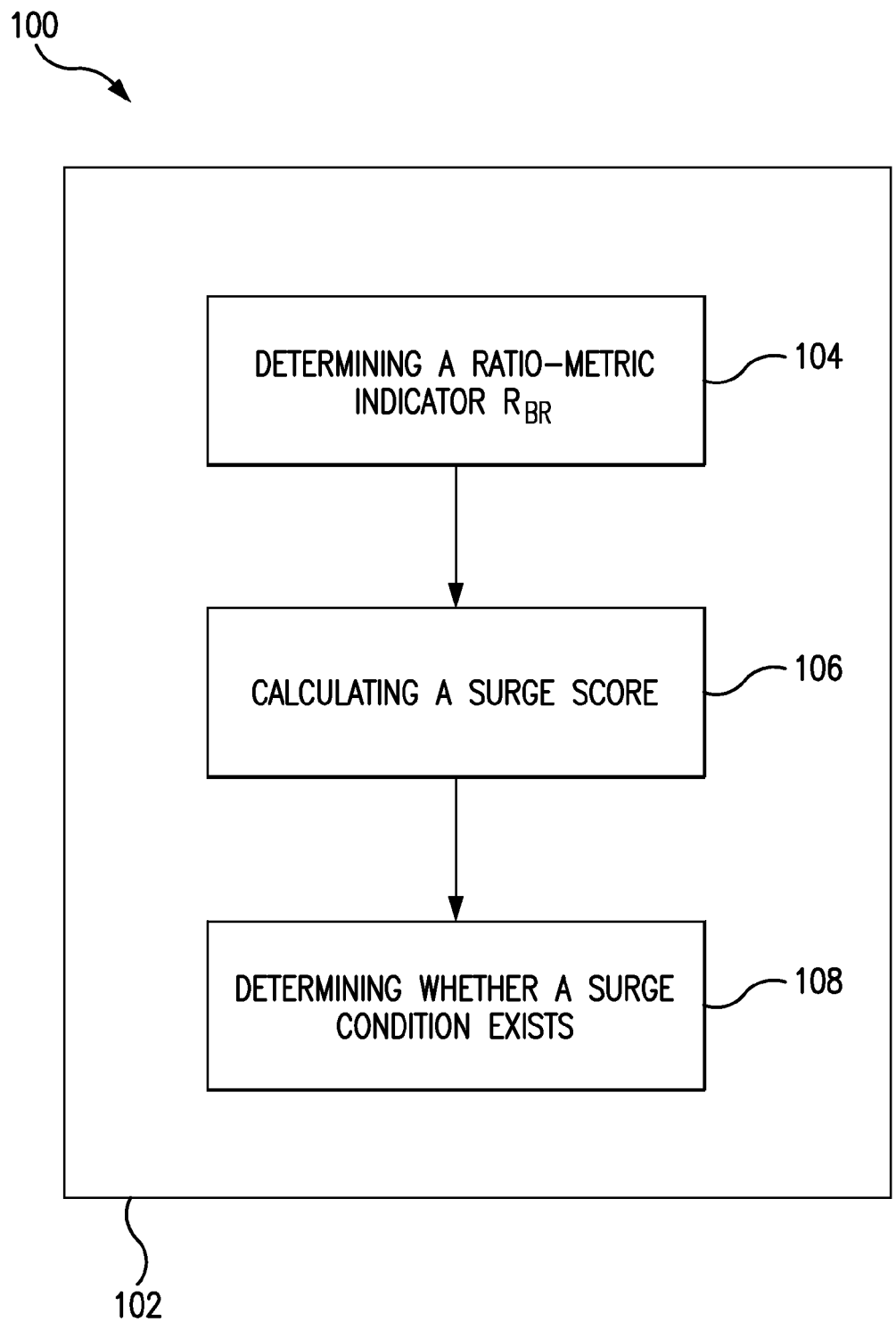
FIG. 1 is a diagram of an exemplary embodiment of a method for monitoring for a surge condition in accordance with the present disclosure, showing a process for detecting a surge condition.

Reference will now be made to the drawings wherein like reference numerals identify similar structural features or aspects of the subject disclosure. For purposes of explanation and illustration, and not limitation, a partial view of an exemplary embodiment of the system and method for monitoring surge and stall conditions in accordance with the disclosure is shown in FIG. 1 and is designated generally by reference character 100. Other embodiments of systems and method in accordance with the disclosure, or aspects thereof, are provided in FIGS. 2-4, as will be described.

Systems and methods in accordance with the present disclosure provide a statistics-based approach to detect surge or stall events through vibration signals measured at a single location. It is contemplated that vibration signals can be collected from any location close to a compressor. The information contained within the vibration signals associated to a compressor's fan blades can not only be directly correlated to the compressor's condition to determine surge or stall events, but may also be used to determine the level of stress the blades' roots are subject to. Those skilled in the art will readily appreciate that blades are used as the example for the analysis in this document, but the approach can also be directly applied to other components. In this way, a component's true condition and health may be directly pinpointed and assessed without the need to trace back to the traditional performance map.

Blade vibration is a forced vibration caused by rotor rotation and air flow, and the aerodynamic forces over a blade are the main source of excitation of blade vibration, see, e.g. as discussed in *Gas Turbine Engine Handbook*, M. P. Boyce, Elsevier, 2011. The readings from dynamic pressure sensors placed close to blades have confirmed that alternating pressure difference around a blade changes fairly regularly and periodically under normal operation, see, e.g. D. H. Linden et al., "Surge Detection in an Industrial Axial Flow Compressor," in *Proceedings of the Twenty-Fifth Turbomachinery Symposium,* 1996, pp. 83-88; and M. Kita et al., "Prediction of Subsynchronous Rotor Vibration Amplitude Caused by Rotating Stall," in *Proceedings of the 37th Turbomachinery Symposium*, Houston, Tex., September, 2008, pp. 8-11. The energy of this forced vibration therefore is present mainly at the blade passing frequency, which is simply the product of the fan rotation speed and the number of blades. As a blade is generally designed to have its natural frequencies much lower than the blade passing frequency at normal operations, the stress at the root of a blade is well confined within design specifications.

When surge starts to develop along with restricted and/or distorted inlet flow, pressure fluctuation increases and the frequency of alternating pressure difference begins to spread away from the single dominant blade passing frequency to a much wider range. Studies have shown that significant amount of excitation is present at a wide frequency band below the blade passing frequency, see, e.g. M. Baumgartner et al., "Non-Engine Order Blade Vibration in a High Pressure Compressor," presented at the 12th International Symposium on Airbreathing Engines, Melbourne, Australia, 1995; J. Thirstrup Petersen et al., *Prediction of Dynamic Loads and Induced Vibrations in Stall,* 1998. Consequently, if one or more of the blades' natural frequencies are within the wider band, high blade displacement amplitudes and equivalently high root stresses will occur. This spread of forced excitation frequency on blades and its overlap with blades' natural frequencies is considered one of the fundamental causes for the excessive blade root stress observed in surge.

The alternating root stresses are transmitted to bearings and other supporting structures, and may be equivalently seen as a vibration source by an external accelerometer mounted to those structures. Under surge conditions, the excessively increased amplitude of root stress is in turn translated to increased energy or Root-Mean-Square (RMS) values over the vibration frequency spectrum at the corresponding blades' natural frequencies. Those skilled in the art will readily appreciate that the RMS values, if root stress is the only source of vibration in the entire system, can be utilized to directly monitor the blades.

Unfortunately, many vibration sources coexist along with the blade vibration source and will be also picked up by the accelerometer, e.g. sensor 202, describe below. Some of those vibration sources are again associated with fan rotation and in general they distribute their excitation energy mostly in integer multiples of fan speed. For example, misalignment caused by the imperfect shaft and re-distribution of air flow through vanes may both be viewed as harmonics of the fan speed. Other equivalent vibration sources, which are less related to the fan speed, further complicate analysis and interpretation of signals measured by the accelerometer. These may include vibration coupled from ambient environment and/or multiple harmonics that are amplified and deformed through cascaded transfer functions of structures in the path of vibration transmission.

The combined effect of these coexisting vibration sources is that measured RMS values have large variation across different fan speeds. This tends to make the direct comparison approach impractical to correctly identify surge condition. Corresponding to the two types of coexisting vibration sources, two main reasons contribute to the large variation of RMS. Firstly, the energy from those vibrations may shift over a wide range of frequencies, pursuant to the change of fan speed, to coincide with the blade natural frequency. It is not uncommon that a sudden increase of RMS value over a certain speed may be observed. Secondly, the energy from the coexisting vibration is expected to gradually change during the normal to surge transition even at a fixed fan speed because of the excitation changes and multiple amplification and attenuation from structures in the path. Without additional signal processing, synthesizing a surge detection algorithm would require a lot of vibration data across a range of fan speed together with true system surge/non-surge status data. Even then the resulting classifier would still likely suffer from numerous problems, such as poor separation over different speeds and inconsistence over different sensor installations.

Mathematically, the above description is explained by first modelling the vibration at one of the blade natural frequencies $\omega_B$ received by the accelerometer as a linear combination of stationary random processes with zero means. The acceleration signal a at $\omega_n$ is be expressed in time t domain as $a(t)=a_B(t)+a_O(t)$, where $a_B$ is an acceleration signal solely from blade vibration and $a_O$ is a combined acceleration signal from other vibration sources. The expected power $P_B$ of the signal at the blade natural frequency $\omega_B$ is obtained by taking ensemble averaging in a discrete form, governed by the following equation:

$$P_B = E[a^2] = E[a_B^2] + E[a_O^2] + 2E[a_B \times a_O] \quad \text{Equation 1}$$

where E[ ] is the expectation operator for a respective acceleration signal, a is the acceleration signal at $\omega_B$ in the time domain, $a_B$ is a component of a solely caused by blade vibration, and $a_O$ is a component of a caused by other vibration sources. Since $a_B(t)$ and $a_O(t)$ are uncorrelated random signals with zero means, the third term on the right hand side of the equation above is decomposed into $E[a_B \times a_O] = E[a_B] \times E[a_O] \Rightarrow 0$. The remaining two terms are actually the variances of the corresponding signals respectively and they are functions of fan speed f and surge severity s, as such, the expected power $P_B$ of the blade vibration is governed by:

$$P_B[f,s] = \sigma_B^2(f,s) + \sigma_O^2(f,s) \quad \text{Equation 2}$$

where $\sigma_B^2$ is the variance of signal component $a_B$ at $\omega_B$ caused by blade vibration, and $\sigma_O^2$ is the variance of signal component $a_O$ at $\omega_B$ caused by other vibration sources where both $\sigma_B^2$ and $\sigma_O^2$ may be expressed as functions of fan speed f and surge severity $s \subset [0,1]$, with 0 and 1 indicating the best normal condition and the worst surge condition respectively. Equation 2, above, establishes a principal guideline how the power or RMS values are used for surge detection, and it suggests that a bivariate implicit function should be used to obtain exact surge severity.

To separate surge from normal conditions, a separation surface is required to be estimated from prior knowledge for the bivariate function in Eq. 2. However, the surface can be convex, concave or of any arbitrary shape depending on actual surge characteristic, sensor installation and location and more factors. Nevertheless, even with some proper assumptions to reduce the bivariate problem to a univariate problem, the granularity of those baseline tests to obtain data needed to construct a classifier may still make classification results uncertain. For example, one can assume that $\sigma_B^2(f, 0)$ remains approximately constant or even effectively zero across all speeds, and then use $P_B(f, 0)$ as a baseline to measure the amount of increased energy to determine surge severity. However, as only a set of discrete speeds are practically used in experiments, the vibration values in the regions between these discrete speed points are "empirically" approximated through interpolation. This actually implies an assumption about the smoothness of $P_B(f, 0)$ between two discrete speeds. More critically, given that $\sigma_B^2(f, 0)$ is subject to changes from laboratory to field and/or from one environment to another, these facts essentially prohibit all approaches, ranging from simple comparison to advanced classification algorithms, to be directly applied without proper separation of vibration sources and root causes of the change of vibration.

To solve this problem, one needs to revisit the main cause of vibration changes between normal and surge conditions, i.e. the spread of pressure excitations and data reported in "Non-Engine Order Blade Vibration in a High Pressure Compressor," M. Baumgartner et al., presented at the 12th International Symposium on Airbreathing Engines, Melbourne, Australia, 1995, reveals that the spread excitation is likely to be pronounced in a high frequency region, say around 50% of the blade passing frequency, while the lower frequency region suffers much less changes from this spread. Assuming that a reference frequency component $\omega_R$ is approximately independent from the blade excitation, Eq. 2 is approximated for $\omega_R$ as, $$P_R(f,s) \simeq \sigma_O^{-2}(f,s) \simeq \frac{1}{k_{BR}} \sigma_O^2(f,s) \quad \text{Equation 3}$$

where $P_R$ is the expected power of the signal at $\omega_R$, and $k_{BR}$ is a scaling factor to adjust for the difference in response spectrum at $\omega_B$ and $\omega_R$. This is understood by knowing that, even if a white noise is used as the input for an accelerometer, the impulse transfer function of an accelerometer mount will still make $k_{BR}$ unlikely to be 1 if $\omega_B$ and $\omega_R$ differ significantly.

With the assumption that $k_{BR}$ is approximated with a constant which is independent from fan speed, a ratio-metric indicator $R_{BR}$ combining Equations 2 and 3 is governed by:

$$R_{BR}(f,s) = \frac{P_B(f,s)}{P_R(f,s)} \approx k_{BR} \left[ \frac{\sigma_B^2(f,s)}{\sigma_O^2(f,s)} + 1 \right] \quad \text{Equation 4}$$

where, given the stated assumption and approximation, $R_{BR}$ provides an approximate measure to weight the blade vibration source with respect to those equivalent vibration sources in vibration signal. With the confirmation of both assumptions from vibration data obtained in our experiments, this effectively provides a new self-referenced ratio-metric indicator to describe the effect of surge by taking advantage of coherent information that exists in different frequency components.

This ratio-metric indicator, $R_{BR}$, provides two significant advantages over absolute measures, such as absolute power or RMS values as discussed previously, as can be seen from examining the bivariate function along each dimension from the standpoint of physics. First, due to the known blade resonance, a significant difference is expected between $R_{BR}$ (F, 1) and $R_{BR}$(F, 0), at a fixed speed F, equivalently expressed as:

$$\frac{d[\sigma_B^2(F,s)]}{ds} \gg \frac{d[\sigma_O^2(F,s)]}{ds} \quad \text{Equation 5}$$

This provides a large separation distance between normal and surge conditions. Secondly, the change of $R_{BR}(f, 0)$ under normal conditions tends to be more likely to be smooth between two discrete speeds since it is known that $\sigma_B^2(f, 0)$ has small changes over speed, and the change rate of $R_{BR}(f, 0)$ is inversely proportional to the change rate of $\sigma_O^2(f, s)$ Mathematically, this is expressed as:

$$\frac{d[\sigma_B^2(f, 0)]}{ds} \approx 0, \text{ and} \qquad \text{Equation 6}$$

$$\frac{d[R_{BR}(f, 0)]}{df} \approx \frac{-k_{BR}\sigma_B^2(f, 0)}{\sigma_O^4(f, 0)} \cdot \frac{d[\sigma_O^2(f, 0)]}{df}$$

Equation 6 suggests that, with a proper selection of a reference frequency component, the ratio-metric indicator in normal conditions, $R_{BR}(f, 0)$ may be approximated by a slowly varying function of speed, or even regarded as a constant value for a limited range of speeds.

In practice, a blade frequency band $\Omega_B$ needs to be used instead of a single blade frequency $\omega_B$ to cover one of the blades' first few modes. This is mainly because of the scatter of natural frequencies of individual blades due to manufacturing imperfections. Also, the natural frequency will be subject to slight increase along with the increase of fan speed due to increased centrifugal forces. For similar reasons, a reference frequency band $\Omega_R$ should be used instead of a single frequency $\omega_B$. Subsequently, the expected power P is obtained using Parseval's theorem such that:

$$P = \frac{1}{N^2} \sum_{\omega \subset \Omega} |S(\omega)|^2 \qquad \text{Equation 7}$$

where N is the number of samples obtained and $S(\omega)$ is the Discrete Fourier Transform (DFT) of the collected signal a(n). Accordingly, ratio-metric indicator $R_{BR}$ from Equation 4 is governed by:

$$R_{BR} = \frac{\sum_{\omega \subset \Omega_B} |S(\omega)|^2}{\sum_{\omega \subset \Omega_R} |S(\omega)|^2} \qquad \text{Equation 8}$$

where $S(\omega)$ is the Discrete Fourier Transform, DFT, for a frequency, $\omega$, of the given slice of vibration data. Those skilled in the art will readily appreciate that each $S(\omega)$ is a complex number with its real and the imaginary parts independently identically normally distributed. With a standard rectangular time window, the normal distribution has a zero mean and a variance as $$\frac{T(\omega)}{2},$$

of which, $T(\omega)$ is the "true" power value. It can be shown that $S(\omega)$ has a $\chi^2$ distribution with both its mean and standard deviation as $T(\omega)$.

It is contemplated that many classification algorithms, such as support vector machine, neural network and Bayesian approaches, can be readily applied with this new ratio-metric indicator to statistically estimate the implicit bivariate function combined by Equations 5 and 8. With the advantages mentioned above, prediction results are likely to outperform those directly from Eq. 2 given limited amount of training data. Nevertheless, as with all data driven approaches, these approaches may still suffer from inexact labeling used for supervised learning and/or potential overtraining. This becomes even more problematic in practical applications in which unsupervised learning has to be made because the exact status of the system under monitoring remains unknown all the time. For these reasons, some applications, such as those for avionics that must be certifiable, may prefer approaches that have type I and II errors quantifiable.

Assuming the selected frequency bands have true power values $T_B$ and $T_R$ over $m_B$ and $m_R$ numbers of frequency bins, respectively, the expected powers are modeled by $\chi^2$ distributions with $2m_B$ or $2m_R$ degree of freedom (DOF) respectively after being standardized by their corresponding true values. As a ratio of two random variables that follow $\chi^2 (2m_B)$ or $\chi^2 (2m_R)$ distributions, the standardized $R_{BR}$ therefore has a F-distribution with DOF, such that $$\frac{m_R \sqrt{T_R}}{m_B \sqrt{T_B}} R_{BR} \sim F(2m_B, 2m_R).$$

Noticing that if $m_R > 2$ the variance of the F distribution is governed by:

$$\text{Var}[F(2m_B, 2m_R)] = \frac{m_R^2(m_B + m_R - 1)}{m_B(m_R - 1)^2(m_R - 2)} \qquad \text{Equation 9}$$

Through transform of variables, the variance of the distribution of $R_{BR}$ is governed by:

$$\text{Var}(R_{BR}) = \frac{T_B}{T_R} \times \frac{m_B(m_B + m_R - 1)}{(m_R - 1)^2(m_R - 2)} \qquad \text{Equation 10}$$

If $m_R \gg 2$ and $m_B \gg 1$, Eq. 10 is approximated to be:

$$\text{Var}(R_{BR}) = \frac{T_B}{T_R} \times \frac{m_B(m_B + m_R)}{m_R^3} \qquad \text{Equation 11}$$

It can be seen from this equation that, comparing to the results with two discrete frequency components, the variance of $R_{BR}$ will asymptotically decrease with the increased number of frequency bins for the reference band while only subject to linear change with increased number of bins for the blade band. The advantage of using $R_{BR}$ obtained from two frequency bands is understood by examining the asymptotically decreasing variance of F or beta prime distribution with respect to the degrees of freedoms. In fact, this is equivalent to averaging results from multiple slices of data with small time window and coarse frequency resolution. This implies that, if two bands are properly selected with the number of bins for each significantly larger than 1, $R_{BR}$ obtained from Equation 8 at the same conditions, i.e. the same fan speed f and surge severity s, will be centered around its expected value and may be reasonably approximated to have a truncated Gaussian distribution.

When the ratio of RMS values is to be used, a similar relationship is obtained after taking square root on the right hand side of Equation 8. This is proved through realizing that the $\chi^2$ distributions will be replaced by Nakagami distributions for those RMS values, and then arriving to a more general beta prime distribution to replace the F distribution above.

To detect surge conditions under different fan speeds, the slowly varying property of $R_{BR}(f, 0)$ over the fan speed concluded from Equation 6 may be taken and combined with the central tendency summarized above. For instance, a collection of samples of the ratio-metric indicators with discrete fan speeds in normal condition is taken as a baseline set of information, and an empirical distribution is statistically established. Since $R_{BR}(F, 0)$ for a fixed speed F is approximated by a truncated Gaussian distribution, the empirical distribution may be quantitatively considered as a mixture of identically weighted truncated Gaussian distributions.

A heuristic approach to utilize the ratio-metric indicator to monitor blade vibration and determine surge status may be taken directly by assuming that $R_{BR}(f, 0)$ is approximated as a constant in a designated range of operating fan speed f. That is, a set of $R_{BR}(F, 0)$ values obtained at a set of discrete speeds are used to parameterize a Gaussian distribution to model the distribution of the indicator under normal conditions. This is justified by considering that, if $R_{BR}(f, 0)$ varies slowly enough, the mixture distribution again degenerates to a truncated Gaussian distribution.

Figure 4:
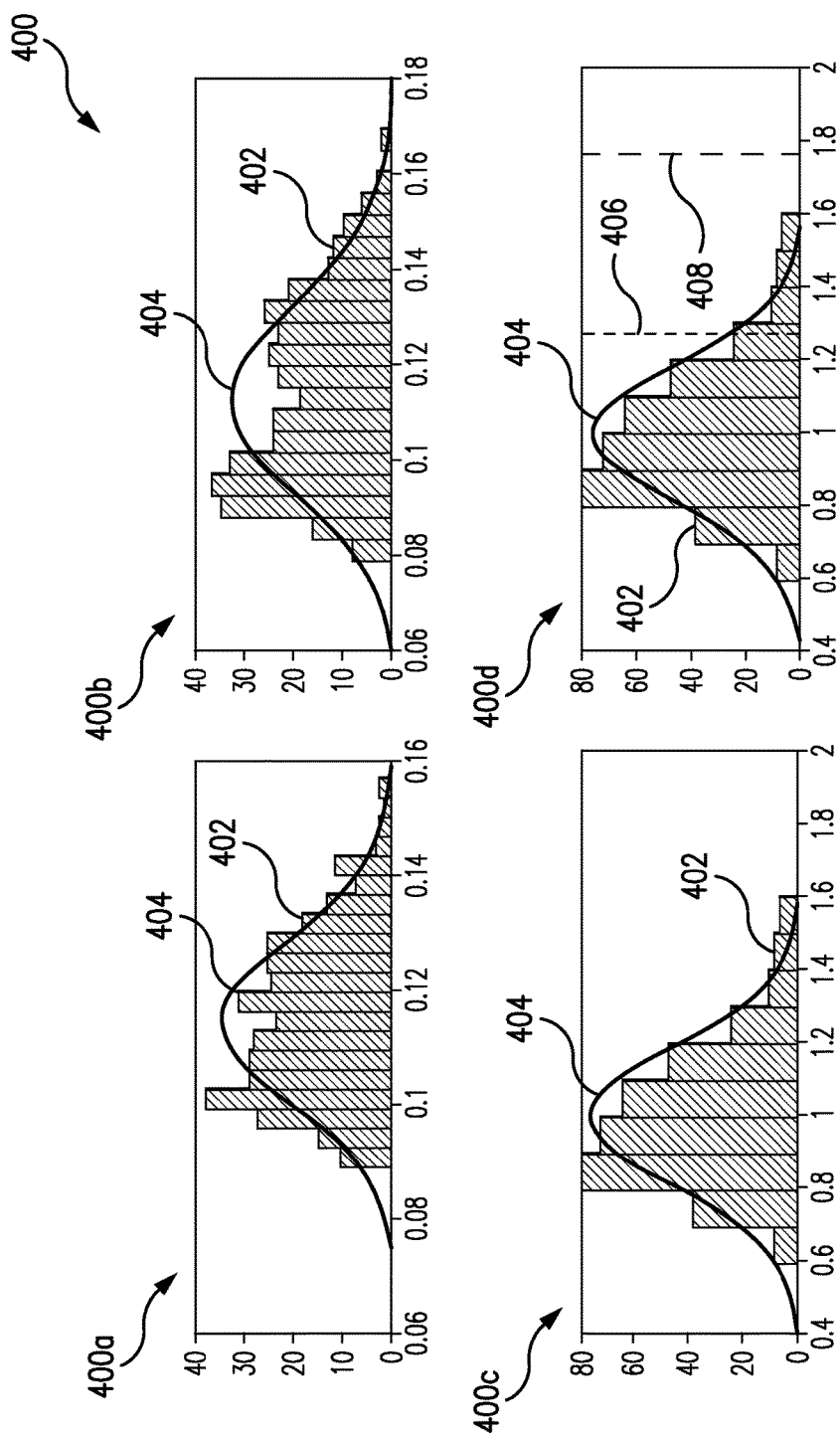
FIG. 4 is a series of graphical illustrations showing distributions of RMS values for a reference band, a blade band, a ratio-metric indicator, and surge scoring using the indicator and its estimated distribution.

Now with reference to FIG. 4, a series of graphs 400 is shown as an example of distributions of RMS values 402 for a reference band 400a; a blade band 400b; a ratio-metric indicator 400c; and surge scoring using the indicator and its estimated distribution 400d. Nakagami distributions 404 are fitted in accordance with each respective set of RMS values 402 and plotted. Since RMS values 402 are from data collected in a wide range of speed, long tails are seen in 400a and 400b. It should be noted that, despite the fact that the data corresponds to the measurements taken in a range of vastly different speeds, those skilled in the art will readily appreciate that the indicator can be approximated by a Gaussian distribution, as shown in 400c.

To empirically establish the Gaussian distribution, a sample ratio mean $R_\mu$ and a sample ratio standard deviation $R_\sigma$ are estimated from vibration obtained in-service as an in-system calibration process. Note that this estimation may still be considered as a supervised learning process in which vibration must be observed under known normal operations.

It is contemplated that a priori knowledge can be utilized to provide supplemental information. In this case, for example, it is known that surge severity and its consequence, i.e. vibration caused by blades, will remain low within the low corrected speed zone. The calibration process takes advantage of this a priori knowledge to make decision about accepting or rejecting data. Subsequently, after the calibration process, a surge score SS based on new $R_{BR}$ is governed by:

$$SS = \frac{R_{BR} - R_\mu}{R_\sigma} \quad \text{Equation 11}$$

where $R_\mu$ and $R_\sigma$ are the estimated parameters as stated above, e.g. $R_\mu$ is a sample mean of a set of ratio-metric indicators and $R_\sigma$ is a sample standard deviation of a set of ratio-metric indicators obtained in an in-service, in-system calibration process. In a typical implementation, $R_{BR}$ deviating from $R_\mu$ more than 3 times of $R_\sigma$, may be sufficiently warranting a surge event. As shown in FIG. 4, graph 400d illustrates the relationship of an estimated distribution and two exemplary $R_{BR}$, under normal 406 and surge 408 conditions.

FIG. 1 is a diagram illustrating a method 100 of monitoring for a surge condition in accordance with the approach described above. Method 100 includes operation 102. Operation 102 includes detecting a surge condition through vibration signals measured at at least one location in a turbomachine. Operation 102 includes operations 104, 106 and 108. Operation 104 includes determining a ratio-metric indicator, $R_{BR}$, by comparing a blade frequency band, $\omega_B$, to a reference frequency band, $\omega_R$, e.g. by comparing amplitudes, energies or powers of blade frequency band, $\omega_B$, to those of reference frequency band, $\omega_R$. Operation 106 includes calculating surge score, SS, wherein surge score SS is governed by Equation 11, described above. Operation 108 includes determining whether a surge condition exists based on the surge score.

Figure 2:
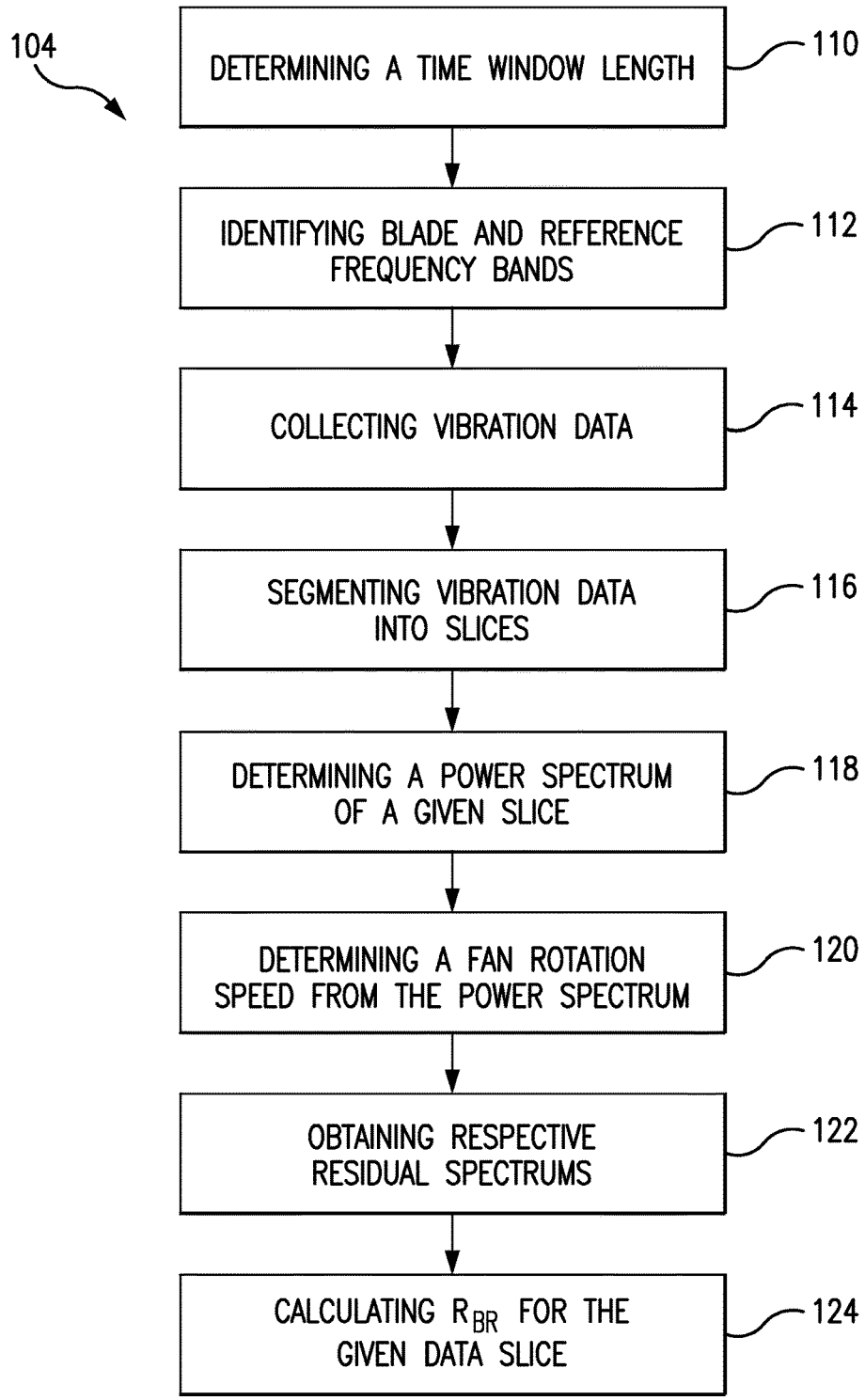
FIG. 2 is a flow-chart diagram of an exemplary embodiment of a method for monitoring for a surge condition in accordance with the present disclosure, showing a process for calculating a ratio-metric indicator for a given slice of vibration data.

As shown in FIG. 2, determining the ratio-metric indicator 104 includes operations 110, 112, 114, 116, 118, 120, 122 and 124. Operation 110 includes determining a time window length for vibration data acquisition. Those having skill in the art will readily appreciate that an appropriate length is both critical to ensure the system under test can be approximated to be in steady state and also to obtain an appropriate frequency resolution. Operation 112 includes identifying the blade frequency band $\omega_B$ and the reference frequency band $\omega_R$. Operation 114 includes collecting vibration data with a known sampling rate with at least one accelerometer operable to generate vibration signals representative of blade vibration and other vibration sources. It is contemplated that an overlapping or non-overlapping time window can be applied. Operation 116 includes segmenting the vibration data into slices based on the time window. Operation 118 includes determining a power spectrum of a given slice by applying a Discrete Fourier Transform (DFT) to each slice.

With continued reference to FIG. 2, operation 120 includes determining a respective fan rotation speed from the power spectrum. Those skilled in the art will readily appreciate that operation 120 is only required if no external synchronized tachometer is available. It will also be appreciated that multiple methods for determining fan rotation speed exist by utilizing the fact that the frequency components corresponding to of the fan rotation speed and its harmonics are pronounced in spectrum. Operation 122 includes obtaining respective residual spectrums from the power spectrum for the blade frequency band $\Omega_B$ and the reference frequency band $\Omega_R$. Operation 124 includes calculating ratio-metric indicator $R_{BR}$ for the given slice of vibration data by comparing the power spectrum of the blade frequency band $\Omega_B$ and the reference frequency band $\Omega_R$ with Equation 8, as described above.

Determining whether a surge condition exists, operation 108, includes comparing the surge score to a discrete set threshold. It is contemplated that operation 108 can include statistically analyzing populations of surge scores accumulated in different durations to monitor long term changes and drift. Determining whether a surge condition exists, operation 108, also includes estimating sample mean $R_\mu$ and sample standard deviation $R_\sigma$ from vibration signals obtained in-service as an in-system calibration process, described below. One example of a discrete set threshold is if ratio-metric indicator $R_{BR}$ deviates from sample mean $R_\mu$ more than three times sample standard deviation $R_\sigma$, then a surge condition exists. Once a surge condition is identified, the steps taken are specific to a given application. For example, the determination of an active surge event may be used to calculate a remaining useful life prediction, recorded for forensic investigation, and/or relayed to upper control systems for close loop controls.

Determining the sample mean $R_\mu$ and the sample standard deviation $R_\sigma$ includes determining the ratio-metric indicators for different speeds within an operating range under known normal conditions, collecting the set of ratio-metric indicators, and calculating sample mean $R_\mu$ and the sample standard deviation $R_\sigma$ based on the collected set of ratio-metric indicators. Those skilled in the art will readily appreciate that to obtain the sample mean $R_\mu$ and the sample standard deviation $R_\sigma$ ratios for data with different speeds within the operating range and under a known normal condition are accumulated using operation 104 and Equation 8. The known normal condition is asserted using either external inputs, e.g. recent inlet cleaning, or a priori knowledge, for example it is known that the impact of surge is less severe at low fan speed.

It is contemplated that determining the fan rotation speed, operation 120, can include rejecting data from which the fan rotation speed is considered to be uncertain. For instance, appropriate rules can be defined by using the information from operation 110 to geometrically measure smeared peak frequency components associated with the fan speed and its harmonics. This tends to ensure that the data represents a steady state, i.e. without large variation in speed such that the system could be under surge for a moment but normal in the rest of time.

Obtaining respective residual spectrums from the power spectrum, operation 122, includes removing peaks associated with the respective fan rotation speed and its harmonics in the blade frequency band $\Omega_B$ and the reference frequency band $\Omega_R$. A width of a frequency window for the peaks to be removed and the number of frequency components to be processed is tied to the type of time window being used.

Figure 3:
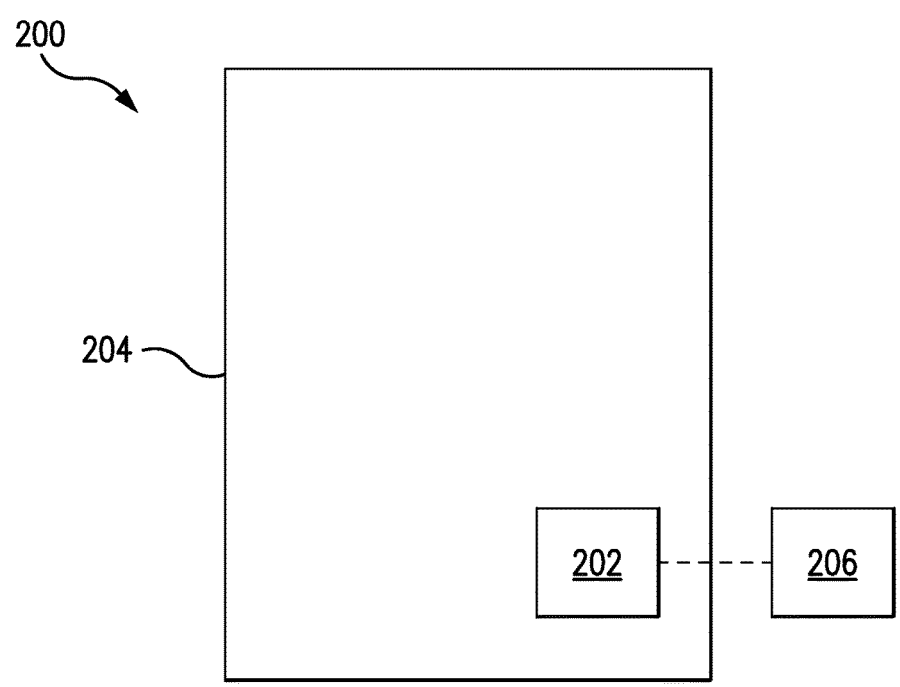
FIG. 3 is a block diagram showing the features of an exemplary embodiment of a system constructed in accordance with the present disclosure.

As shown in FIG. 3, a schematic block diagram illustrates the components of a turbomachinery surge monitoring system 200. Turbomachinery surge monitoring system 200 includes at least one sensor 202 coupled to a compressor system 204, for example on a blade in compressor system 204, and a processing unit 206 coupled to the at least one sensor 202. Sensor 202 may be an accelerometer or the like, such as a surface mounted transducer which converts vibrations in form of acceleration to electrical output. Processing unit 206 includes a plurality of program instructions to determine whether a surge condition exists based on the reading from sensor 202. The program instructions include instructions to detect a surge condition through vibration signals measured at at least one location in a turbomachine, e.g. operation 102. Program instructions to detect a surge condition include instructions to determine ratio-metric indicator $R_{BR}$, e.g. operation 104, by comparing a blade frequency band $\Omega_B$ to a reference frequency band $\Omega_R$, program instructions to calculate surge score SS with Equation 11, e.g. operation 106, and program instructions to determine whether a surge condition exists, e.g. operation 108.

It will be understood by those skilled in the art that FIG. 3 is intended to provide a brief, general description of an illustrative and/or suitable exemplary environment in which embodiments of the above described present invention may be implemented. FIG. 3 is exemplary of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The methods and systems of the present disclosure, as described above and shown in the drawings, provide for a system and method with superior properties including monitoring of a turbomachine more specifically, the compressor therein. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A method for monitoring for a turbomachine for a surge condition, comprising:
   detecting a surge condition through vibration signals measured at at least one location in a turbomachine, wherein detecting a surge condition includes:
   determining a ratio-metric indicator, $R_{BR}$, by comparing a blade frequency band, $\Omega_B$, to a reference frequency band, $\Omega_R$, wherein determining the ratio-metric indicator $R_{BR}$ includes:
   determining a time window length for vibration data acquisition;
   identifying the blade frequency band $\Omega_B$ and the reference frequency band $\Omega_R$;
   collecting vibration data with a known sampling rate with at least one accelerometer operable to generate the vibration signals representative of blade vibration and other vibration sources;

segmenting the vibration data into slices based on a time window;

determining a power spectrum of a given slice of vibration data;

obtaining respective residual spectrums from the power spectrum for the blade frequency band $\Omega_B$ and the reference frequency band $\Omega_R$; and calculating the ratio-metric indicator, $R_{BR}$, for the given slice of vibration data by comparing the power spectrum of the blade frequency band $\Omega_B$ and the reference frequency band $\Omega_R$ with the following equation:

$$R_{BR} = \frac{\sum_{\omega \subset \Omega_B} |S(\omega)|^2}{\sum_{\omega \subset \Omega_R} |S(\omega)|^2}$$

wherein $S(\omega)$ is the Discrete Fourier Transform, DFT, for a frequency, $\omega$, of the given slice of vibration data;

calculating a surge score, SS, with the following equation:

$$SS = \frac{R_{BR} - R_\mu}{R_\sigma}$$

wherein $R_\mu$ is a sample mean of a set of ratio-metric indicators and $R_\sigma$ is a sample standard deviation of a set of ratio-metric indicators;

determining whether a surge condition exists based on the surge score SS; and altering operation of the turbomachine if a surge condition is determined.

2. A method as recited in claim 1, wherein determining whether a surge condition exists includes statistically analyzing populations of surge scores accumulated in different durations to monitor long term changes and drift.

3. A method as recited in claim 1, wherein determining if a surge condition exists includes determining that the surge condition does exist if the ratio-metric indicator, $R_{BR}$, deviates from the sample ratio mean, $R_\mu$, more than three times the ratio sample ratio standard deviation, $R_\sigma$.

4. A method as recited in claim 1, wherein determining whether a surge condition exists includes estimating the sample ratio mean, $R_\mu$, and the sample ratio standard deviation, $R_\sigma$, from vibration signals obtained in-service as an in-system calibration process.

5. A method as recited in claim 1, wherein determining the sample ratio mean, $R_\mu$, and the sample ratio standard deviation, $R_\sigma$, includes determining ratio-metric indicator data for different speeds within an operating range under known normal conditions, collecting the ratio-metric indicator data, and calculating the sample ratio mean, $R_\mu$, and the sample ratio standard deviation, $R_\sigma$, based on the collected ratio-metric indicator data.

6. A method as recited in claim 1, wherein determining the ratio-metric indicator includes determining a respective fan rotation speed from the power spectrum.

7. A method as recited in claim 6, wherein the step of determining the fan rotation speed includes rejecting data from which the fan rotation speed is considered to be uncertain.

8. A method as recited in claim 6, wherein obtaining respective residual spectrums from the power spectrum includes removing peaks associated with the respective fan rotation speed and its harmonics in the blade frequency band $\Omega_B$ and the reference frequency band $\Omega_R$.

9. A method as recited in claim 8, wherein a width of a frequency window for the peaks to be removed is tied to the type of time window being used.

10. A turbomachinery surge monitoring system, comprising:

at least one sensor coupled to a compressor system; and a processing unit coupled to the at least one sensor including a plurality of program instructions comprising:

program instructions to detect a surge condition through vibration signals measured at at least one location in a turbomachine, wherein program instructions to detect a surge condition include:

program instructions to determine a ratio-metric indicator, $R_{BR}$, by comparing a blade frequency band, $\Omega_B$, to a reference frequency band, $\Omega_R$, wherein determining the ratio-metric indicator $R_{BR}$ includes:

determining a time window length for vibration data acquisition;

identifying the blade frequency band $\Omega_B$ and the reference frequency band $\Omega_R$;

collecting vibration data with a known sampling rate with the at least one sensor operable to generate the vibration signals representative of blade vibration and other vibration sources;

segmenting the vibration data into slices based on a time window;

determining a power spectrum of a given slice of vibration data;

obtaining respective residual spectrums from the power spectrum for the blade frequency band $\Omega_B$, and the reference frequency band $\Omega_R$; and calculating the ratio-metric indicator, $R_{BR}$, for the given slice of vibration data by comparing the power spectrum of the blade frequency band $\Omega_B$ and the reference frequency band $\Omega_R$ with the following equation:

$$R_{BR} = \frac{\sum_{\omega \subset \Omega_B} |S(\omega)|^2}{\sum_{\omega \subset \Omega_R} |S(\omega)|^2}$$

wherein $S(\omega)$ is the Discrete Fourier Transform, DFT, for a frequency, $\omega$, of the given slice of vibration data;

program instructions to calculate a surge score, SS, with the following equation:

$$SS = \frac{R_{BR} - R_\mu}{R_\sigma}$$

wherein $R_\mu$ is a sample mean of a set of ratio-metric indicators and $R\sigma$ is a sample standard deviation of a set of ratio-metric indicators;

program instructions to determine whether a surge condition exists based on the surge scoreSS; and program instructions to alter operation of the compressor if a surge condition is determined.

11. A system as recited in claim 10, wherein program instructions to determine whether a surge condition exists include program instructions to statistically analyze populations of surge scores accumulated in different durations to monitor long term changes and drift.

12. A system as recited in claim 10, wherein program instructions to determine whether a surge condition exists include program instructions to determine that the surge condition does exist if the ratio-metric indicator, $R_{BR}$, deviates from the sample ratio mean, $R_\mu$, more than three times the ratio sample ratio standard deviation, $R_\sigma$.

13. A system as recited in claim 10, wherein program instructions to determine whether a surge condition exists include program instructions to estimate the sample ratio mean, $R_\mu$, and the sample ratio standard deviation, $R_\sigma$, from vibration signals obtained in-service as an in-system calibration process.

* * * * *